(12) United States Patent
Frea

(10) Patent No.: US 12,345,639 B2
(45) Date of Patent: Jul. 1, 2025

(54) SYSTEM FOR DETERMINING A WHEEL-RAIL ADHESION VALUE FOR A RAILWAY VEHICLE

(71) Applicant: FAIVELEY TRANSPORT ITALIA S.P.A., Turin (IT)

(72) Inventor: Matteo Frea, Turin (IT)

(73) Assignee: Faiveley Transport Italia S.P.A., Turin (IT)

(*) Notice: Subject to any disclaimer, the term of this patent is extended or adjusted under 35 U.S.C. 154(b) by 102 days.

(21) Appl. No.: 17/756,308

(22) PCT Filed: Nov. 20, 2020

(86) PCT No.: PCT/IB2020/060951
§ 371 (c)(1),
(2) Date: May 20, 2022

(87) PCT Pub. No.: WO2021/100003
PCT Pub. Date: May 27, 2021

(65) Prior Publication Data
US 2024/0011904 A1 Jan. 11, 2024

(30) Foreign Application Priority Data
Nov. 22, 2019 (IT) .................. 102019000021951

(51) Int. Cl.
*G01N 21/55* (2014.01)
*B61L 15/00* (2006.01)
*G06T 7/00* (2017.01)

(52) U.S. Cl.
CPC .......... *G01N 21/55* (2013.01); *B61L 15/0072* (2013.01); *B61L 15/0081* (2013.01);
(Continued)

(58) Field of Classification Search
CPC . G01N 21/55; B61L 15/0094; B61L 15/0072; B61L 15/0081; G06T 6/0002
See application file for complete search history.

(56) References Cited

U.S. PATENT DOCUMENTS

| 2014/0129060 A1* | 5/2014 | Cooper | G07C 5/008 |
| | | | 701/19 |
| 2023/0090923 A1* | 3/2023 | Tione | B61L 15/0081 |
| | | | 701/69 |

FOREIGN PATENT DOCUMENTS

| CN | 108974043 A | 12/2018 | |
| DE | 102011113069 A1 * | 3/2013 | .......... B60B 39/025 |

(Continued)

OTHER PUBLICATIONS

ISA European Patent Office, International Search Report Issued in Application No. PCT/IB2020/060951, Feb. 16, 2021, WIPO, 3 pages.

*Primary Examiner* — Natalie Huls
*Assistant Examiner* — Nyla Gavia
(74) *Attorney, Agent, or Firm* — K&L Gates LLP

(57) ABSTRACT

A system for determining an adhesion value between wheel and rail for a railway vehicle is described, comprising an optical information acquisition means arranged to acquire optical information from the rail, a database arranged to store the acquired optical information in at least a learning phase and to associate said information with a relevant real wheel-rail adhesion value measured at the moment of acquisition of the optical information, a control unit arranged to determine the current wheel-rail adhesion value on the basis of a comparison between current acquired optical information and the optical information previously stored in the database. The control unit determines that the current wheel-rail adhesion value associated with the current acquired optical information corresponds to the adhesion value asso- (Continued)

ciated with the optical information stored in the database having the highest degree of similarity with the current acquired optical information.

11 Claims, 4 Drawing Sheets

(52) U.S. Cl.
CPC ........ *B61L 15/0094* (2024.01); *G06T 7/0002* (2013.01); *G06T 2207/10016* (2013.01); *G06T 2207/30252* (2013.01)

(56) References Cited

FOREIGN PATENT DOCUMENTS

| | | | | |
|---|---|---|---|---|
| DE | 102011113117 | A1 * | 3/2013 | ............ B60T 8/1705 |
| DE | 102016005248 | A1 | 11/2017 | |
| DE | 102011113073 | C5 * | 3/2022 | ............ B60T 13/665 |
| EP | 3168111 | A1 * | 5/2017 | ............ B60T 8/1705 |
| FR | 3057380 | A1 * | 4/2018 | ............ G06T 7/0004 |
| JP | 2009292380 | A | 12/2009 | |

* cited by examiner

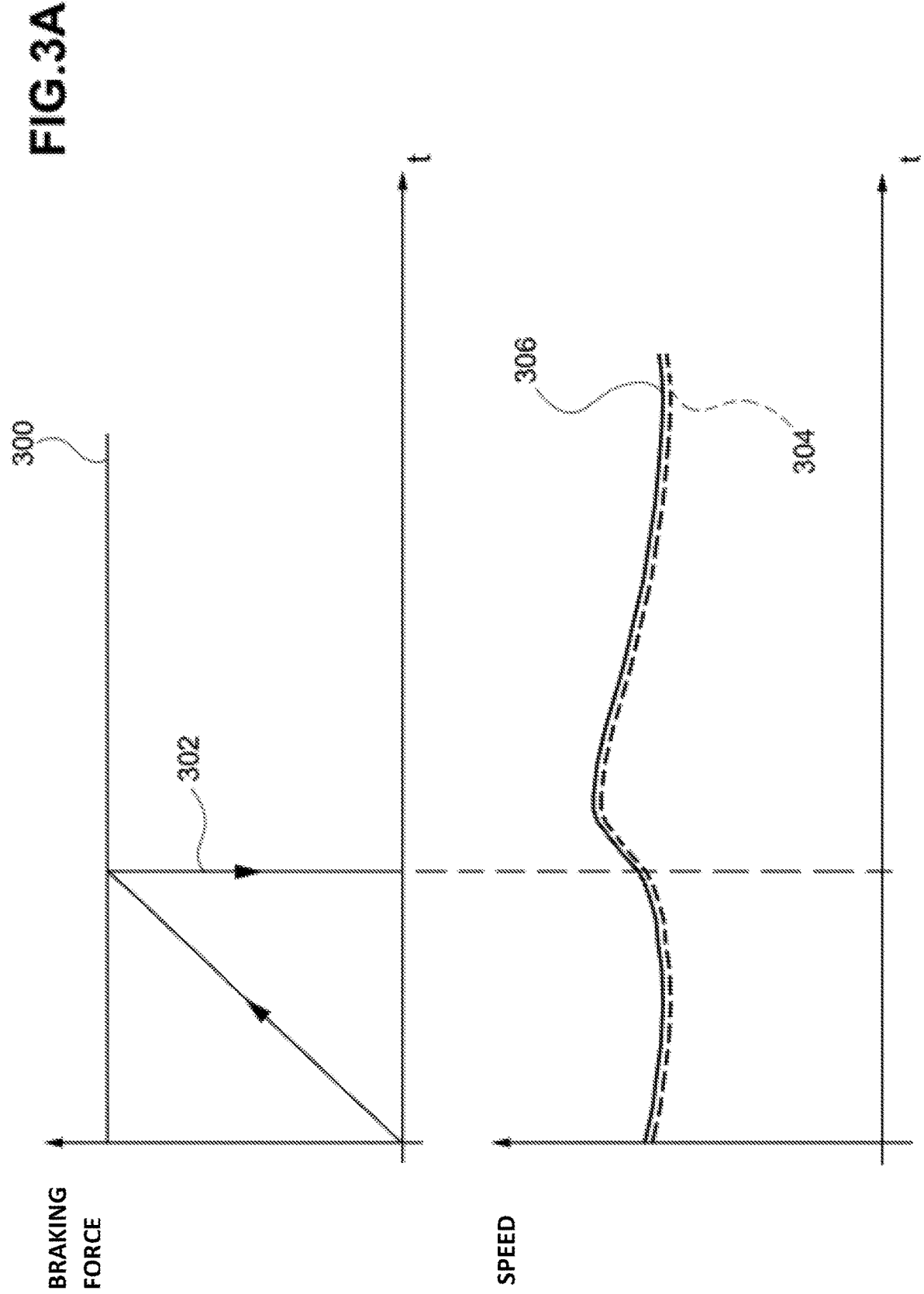

SYSTEM FOR DETERMINING A WHEEL-RAIL ADHESION VALUE FOR A RAILWAY VEHICLE

CROSS REFERENCE TO RELATED APPLICATIONS

The present application is a U.S. National Phase of International Application No. PCT/IB2020/060951 entitled "SYSTEM FOR DETERMINING A WHEEL-RAIL ADHESION VALUE FOR A RAILWAY VEHICLE," and filed on Nov. 20, 2020. International Application No. PCT/IB2020/060951 claims priority to Italian Patent Application No. 102019000021951 filed on Nov. 22, 2019. The entire contents of each of the above-listed applications are hereby incorporated by reference for all purposes.

TECHNICAL FIELD

This invention relates, in general, to the railway vehicle sector; in particular, the invention refers to a system for determining a wheel-rail adhesion value for a railway vehicle.

PRIOR ART

The prior art for measuring wheel-rail adhesion is fundamentally based on "indirect" solutions based on vision or reflection optical sensors, or on "direct" solutions that implement a brake or traction control dedicated to estimating adhesion. This second category includes, for example, solutions which apply a known braking force to one or more axles and detect their response in terms of rotational speed. Using the braking force and the angular acceleration, it is easy to deduce the adhesion available in the wheel-rail contact.

However, disadvantageously, the optical solutions based on vision or reflection are basically not used as they must be appropriately pre-calibrated through complex calibration procedures, which are nevertheless susceptible to the environmental conditions of visibility and lighting in which the system will operate.

Direct adhesion measurements, on the other hand, although reliable, may only be carried out if a braking torque is applied to the axle. Therefore, this measurement may only be performed during the braking phase, unless a dedicated brake control is implemented which, for example, periodically applies a known braking force and detects the response of the axle in terms of angular acceleration. Disadvantageously, the dedicated control solution allows the adhesion to be measured with the desired spatial-temporal resolution, but requires the periodic application, not necessary for vehicle travel, of a braking force to at least one axle of the railway vehicle.

SUMMARY OF INVENTION

An object of this invention is to provide a system for determining a wheel-rail adhesion value for a railway vehicle which is capable of self-calibrating during use, for example based on artificial intelligence techniques. The system for determining a wheel-rail adhesion value for a railway vehicle calibrates the results from optical sensors on the basis of direct adhesion measurements. Due to the aforesaid system, the interpretation of indirect measurements based on optical sensors will be increasingly reliable as the self-calibration procedure of the system will have accumulated a series of events, i.e. direct adhesion measurements. The reliability of the indirect measurements obtained by the appropriately calibrated system will allow a reliable and continuous measurement of wheel-rail adhesion and at the same time will allow the need for braking dedicated only to the measurement of adhesion to be reduced or eliminated.

The aforesaid and other objects and advantages are achieved, according to an aspect of the invention, by a system for determining a wheel-rail adhesion value for a railway vehicle having the features defined in claim 1. Preferred embodiments of the invention are defined in the dependent claims, the content of which is to be understood as an integral part of this description.

BRIEF DESCRIPTION OF THE DRAWINGS

The functional and structural features of some preferred embodiments of a system for determining a wheel-rail adhesion value for a railway vehicle according to the invention will now be described. Reference is made to the appended drawings, wherein:

FIGS. 3A and 3B each illustrate an example of direct adhesion measurement by applying a braking force to an axle.

DETAILED DESCRIPTION

Figure 1:
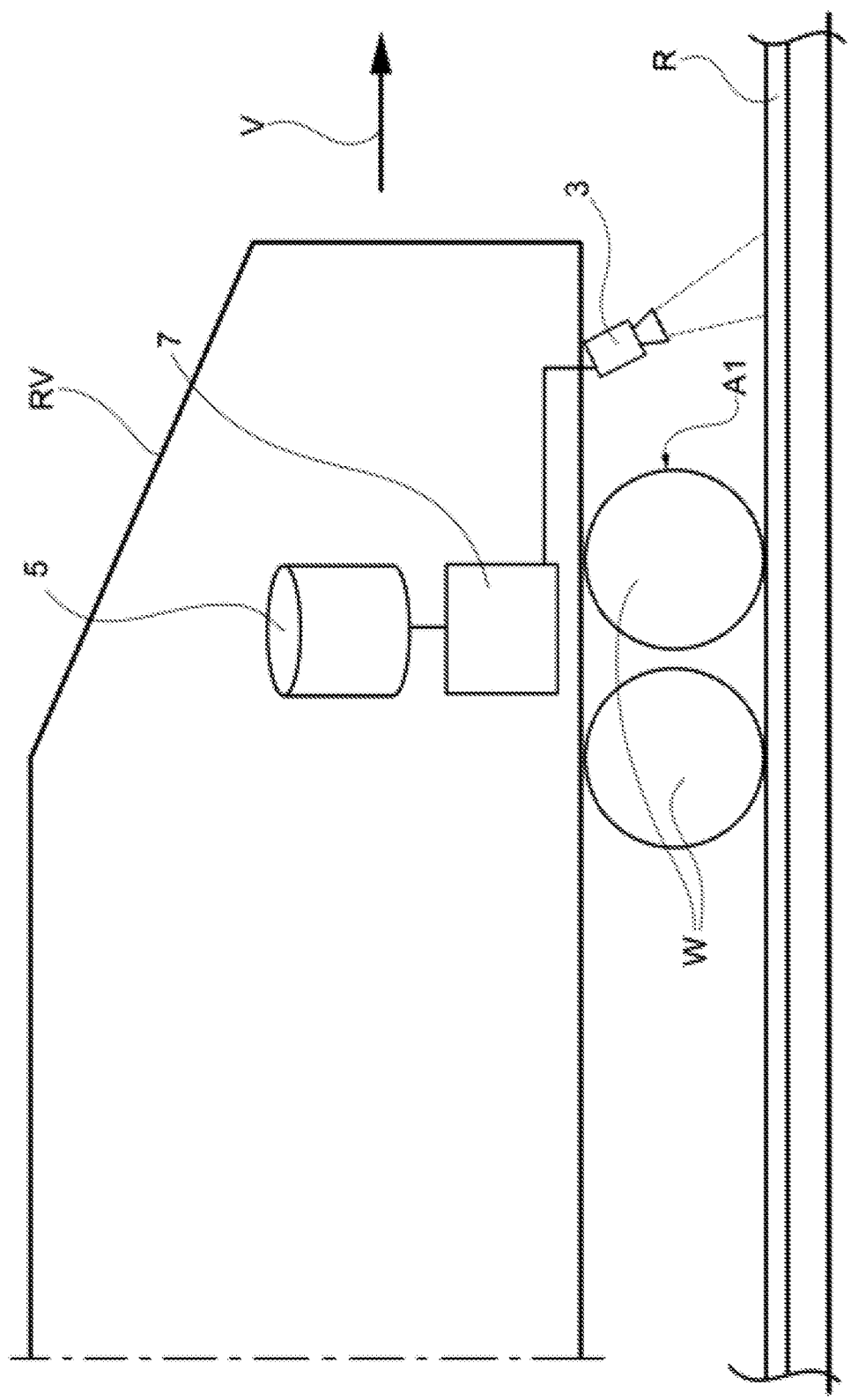
FIG. 1 illustrates an embodiment of a system for determining a wheel-rail adhesion value for a railway vehicle.

Before describing in detail a plurality of embodiments of the invention, it should be clarified that the invention is not limited in its application to the construction details and configuration of the components presented in the following description or illustrated in the drawings. The invention is capable of assuming other embodiments and of being implemented or constructed in practice in different ways. It should also be understood that the phraseology and terminology have a descriptive purpose and should not be construed as limiting. The use of "include" and "comprise" and their variations are to be understood as encompassing the elements set out below and their equivalents, as well as additional elements and the equivalents thereof.

Referring initially to FIG. 1, a system for determining an adhesion value between wheel W and rail R for a railway vehicle RV is illustrated.

This system comprises an optical information acquisition means 3 arranged to acquire optical information from the rail R, and a database 5 arranged, at least in a learning phase, to store the optical information and associate it with a respective real adhesion value between wheel W and rail R measured substantially at the moment of acquisition of the optical information by the optical information acquisition means 3. Clearly, the database 5 may be arranged to store the optical information and associate it with a respective real adhesion value between wheel W and rail R substantially measured at the moment of acquisition of the optical information by the optical information acquisition means 3, even during use following the initial learning phase, so as to continue with the training of the system even during its operational use.

In other words, the optical information may be cataloged in the database 5 as a function of respective real adhesion values between wheel W and rail R.

The measured real adhesion value between wheel W and rail W may be measured by braking an axle of the railway vehicle RV and analyzing the behavior of said axle. The fact of braking only one axle does not affect the behavior of the railway vehicle, as a single braked axle is not sufficient to influence the movement dynamics of the railway vehicle. In this way it will be possible to measure the real wheel-rail adhesion value without having negative effects on the speed of the railway vehicle and on the comfort of the passengers on board this railway vehicle. Preferably, the axle of the railway vehicle is braked until said axle begins to skid or up to a predetermined limit value.

Figure 3B:
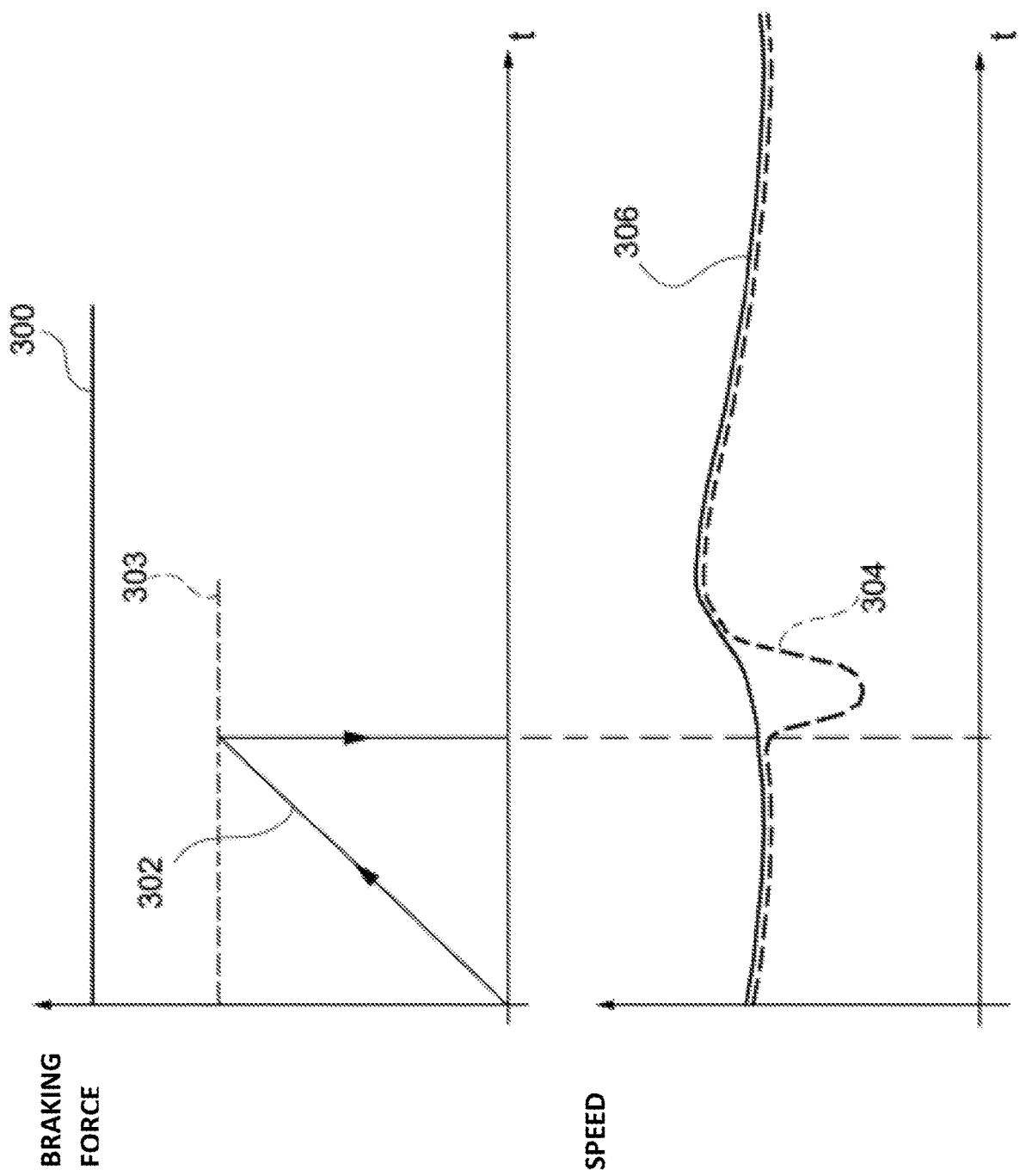

As may be seen in FIGS. 3A and 3B, two examples of direct adhesion measurement are shown by applying a (dedicated) braking force to an axle.

In the graph, 300 indicates the maximum braking force, at axle level, which may be required by an exemplifying railway vehicle in question. Typically, the maximum braking force is the braking force applied during emergency braking.

The procedure for direct adhesion measurement consists in applying a braking force 302 to one or more axles with an increasing ramp. This ramp is interrupted, bringing the braking force back to zero, if the maximum braking force 300 is reached, as illustrated in FIG. 3A, or if the axle in question begins to skid, i.e. its tangential speed 304 deviates from the travel speed 306 of the vehicle, as illustrated in FIG. 3B.

In the case of FIG. 3A it is not possible to quantify the wheel-rail adhesion, but it may be stated that the wheel-rail adhesion is sufficient to apply the maximum braking force, for example, an emergency braking. Typically, the adhesion engaged by emergency braking is on the order of 0.15. Thus, in the case of FIG. 3A, it may be stated that the wheel-rail adhesion is greater than, for example, 0.15.

In any case, the adhesion measurement, in the event that it exceeds the adhesion necessary for emergency braking, is not of particular interest.

Alternatively, in the case of FIG. 3B, the wheel-rail adhesion is not sufficient for the application of the maximum braking force. Once a certain braking force value is reached, indicated by the dashed line, the axle begins to skid. At this point, the braking force is immediately reset to zero and the axle recovers the speed of the vehicle.

The adhesion may be calculated using the following relationship:

$$\mu = \frac{F_{brake} * R + J * \omega}{M * g * R}$$

Where:
μ: wheel-rail adhesion;
F_brake: braking force applied to the axle;
R: wheel radius;
J: inertia of the axle;
ω: angular acceleration of the axle;
M: mass weighing on the axle;
G: acceleration of gravity.

Figure 2:
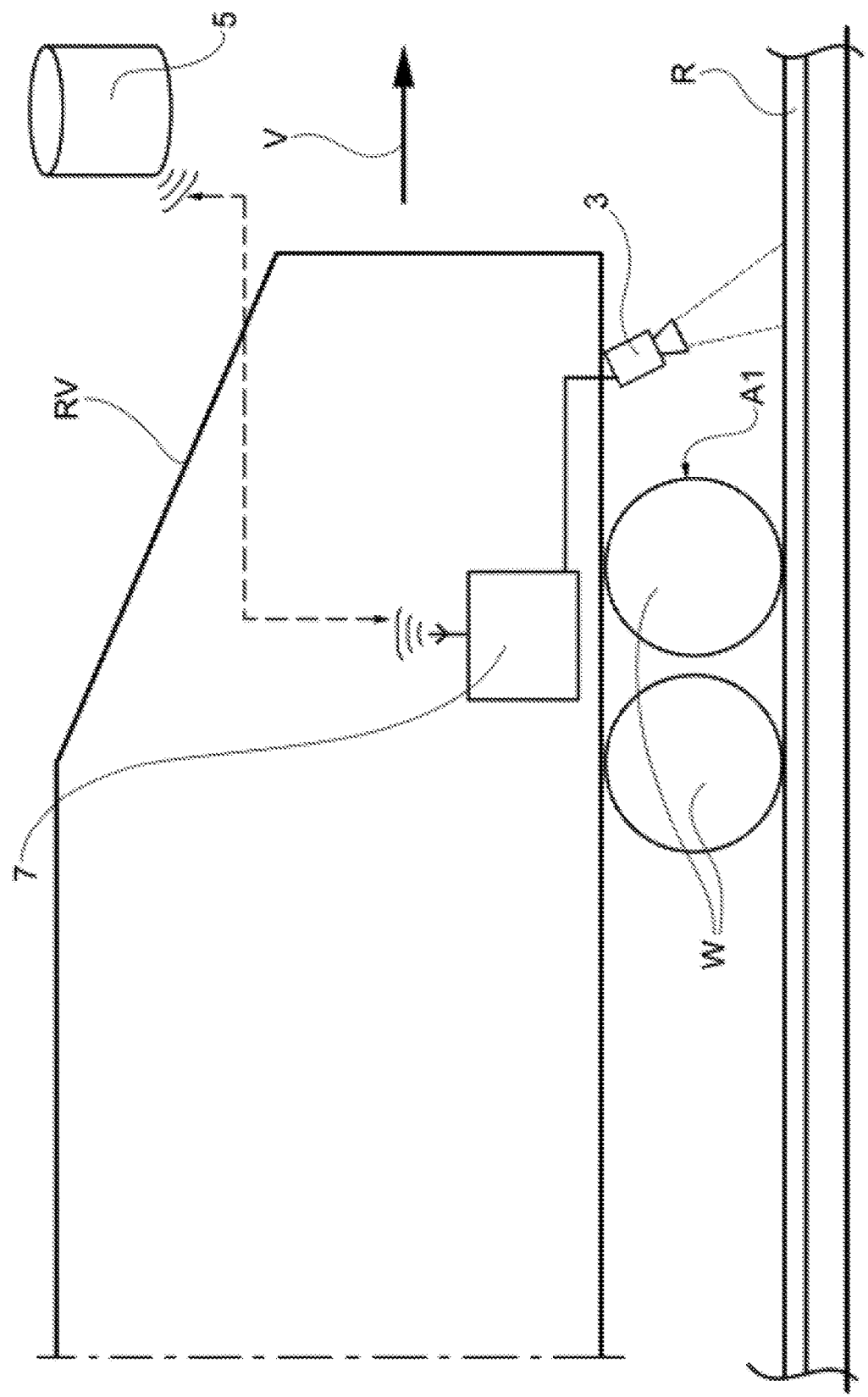
FIG. 2 illustrates a further embodiment of a system for determining a wheel-rail adhesion value for a railway vehicle.

As may be seen in FIG. 1, the database 5 may be obtained on board the railway vehicle, or, as may be seen in FIG. 2, the database 5 may be arranged remotely with respect to the railway vehicle. If the database 5 is remote, the system will be able to communicate with it through an appropriate wireless communication.

The system further comprises a control unit 7 arranged to determine the current wheel-rail adhesion value on the basis of a comparison between current acquired optical information and the optical information previously stored in the database 5.

Advantageously, in light of the currently determined wheel-rail adhesion value, it will be possible to provide suggestions to the operator through a suitable human-machine interface arranged in the cabin. Alternatively or additionally, in light of the current determined wheel-rail adhesion value, it will be possible to automatically control the braking system of the railway vehicle and/or a WSP system of the railway vehicle, and/or the acceleration level of the railway vehicle.

The control unit 7 may for example be a PLC, a microprocessor, a microcontroller, or an FPGA.

As may be seen in the figures, the optical information acquisition means 3 may be arranged in the railway vehicle in such a way as to acquire the optical information on the rail which is placed in front of a first axle A1 of the railway vehicle, according to the direction of travel V of the railway vehicle.

In this way, it will be possible to obtain optical information for the rail not disturbed by the passage of the wheels of the railway vehicle, which would tend to clean the rail or in any case to modify its state.

The control unit 7 is arranged to determine that the current wheel-rail adhesion value associated with the current optical information acquired by the optical information acquisition means 3 corresponds to the adhesion value associated with the optical information stored in the database 5 having a greater degree of similarity with current optical information.

Clearly, the degree of similarity may be determined by the control unit 7 through deep learning algorithms.

"Deep learning" refers to the research field of machine learning and artificial intelligence that is based on different levels of representation. Deep learning is a set of techniques based on artificial neural networks organized in different layers, where each layer calculates the values for the subsequent layer so that the information is processed more and more completely.

Image recognition is a branch of computer science called "computer vision."

Algorithms for image recognition may be used to define the degree of similarity. In a broad sense, recognizing an image automatically means using algorithms that receive an input image and are able to extract various information therefrom. The extracted information may be placed on several levels: low level (such as statistics on the presence of various shades of gray or colors, on sudden changes in brightness, etc.); intermediate level (characteristics related to regions of the image and relationships between regions) or high level (determination of objects with semantic significance). It is possible to recognize two images as similar even if only based on the low- or intermediate- or high-level characteristics.

Preferably, the optical information acquisition means 3 is a vision or image acquisition sensor, such as for example a video camera or a camera.

Alternatively, the optical information acquisition means 3 may be a reflection-based optical sensor. In this case, the reflection-based optical sensor is arranged to send a light signal towards the rail and to detect a quantity and/or distribution of the light signal reflected from the rail indicative of a condition of the surface of the rail.

In order to calibrate the system, the database 5 may pre-store a predetermined quantity of known optical information to which respective known adhesion values are associated, the correctness of which has been previously verified. The information stored will then be subsequently enhanced and updated during the normal operation of the railway vehicle. For example, the optical information may be acquired by the optical information acquisition means 3 at determined time intervals, or upon detection of a degraded adhesion condition.

Taking now a practical example, in a first phase of populating the database, by means of the optical information acquisition means 3 a determined quantity of optical information is taken which is associated with respective real wheel-rail adhesion values measured substantially in the moments of the acquisitions of the respective optical information from the optical information acquisition means 3. In a second operational step, the optical information acquisition means 3 will pick up one or more additional items of optical information which will be used to determine the current wheel-rail adhesion value in comparison with the additional optical information and the optical information previously stored in the database 5. In particular, it is determined that the current wheel-rail adhesion value corresponds to the adhesion value associated with the optical information stored in the database 5 having a greater degree of similarity with the additional current optical information.

The advantage achieved is therefore that of having provided a system for determining a wheel-rail adhesion value for a railway vehicle that is capable of self-calibrating in an increasingly reliable way as the self-calibration of the system will have accumulated a series of past events. Due to the appropriately calibrated system, the interpretation of indirect measurements based on optical sensors will be increasingly more reliable and will therefore allow for the reduction or elimination of the need for braking dedicated only to measuring adhesion.

Various aspects and embodiments of a system for determining a wheel-rail adhesion value for a railway vehicle according to the invention have been described. It is understood that each embodiment may be combined with any other embodiment. Furthermore, the invention is not limited to the described embodiments, but may be varied within the scope defined by the appended claims.

The invention claimed is:

1. A system for determining an adhesion value between wheel and rail for a railway vehicle, comprising:
an optical sensor arranged to acquire optical information from the rail;
a database arranged, at least in a learning phase, to store the acquired optical information and match the acquired optical information to a corresponding wheel-rail adhesion value, wherein each wheel-rail adhesion value is derived from a braking force measured during braking at an axel of the railway vehicle and concurrent with the of acquisition of the corresponding optical information acquired by the optical sensor;
a control unit arranged to determine a current wheel-rail adhesion value from current optical information acquired by the optical sensor based on identifying the wheel-rail adhesion value that is matched with the optical information stored in the database having the highest degree of similarity with the current acquired optical information.

2. The system according to claim 1, wherein the optical sensor is a vision sensor.

3. The system according to claim 2, wherein the vision sensor includes a video camera or a camera.

4. The system according to claim 1, wherein the optical sensor is an optical sensor based on reflection.

5. The system according to claim 4, wherein the optical sensor based on reflection is arranged to send a light signal towards the rail and to detect a quantity and/or a distribution of the light signal reflected by the rail indicative of a condition of the rail surface.

6. The system according to claim 1, wherein the control unit is configured to identify the wheel-rail adhesion value that is matched with the optical information stored in the database having the highest degree of similarity with the current optical information through image recognition algorithms based on artificial intelligence and/or machine learning.

7. The system according to claim 1, wherein the database is remote with respect to the railway vehicle.

8. The system according to claim 1, wherein the optical sensor is arranged in the railway vehicle so as to acquire the optical information of the rail which is placed in front of a first axle of the railway vehicle, according to the direction of travel of the railway vehicle.

9. The system according to claim 1, wherein the database is arranged to store a predetermined quantity of known optical information that is matched with respective known adhesion values, the correctness of which has been verified beforehand.

10. The system according to claim 1, wherein the real wheel-rail adhesion value is measured by analyzing the behavior of an axle of the railway vehicle during a braking phase.

11. The system according to claim 10, wherein the axle of the railway vehicle is braked until such axle begins to skid or up to a predetermined limit value.

* * * * *